(12) United States Patent
Davies

(10) Patent No.: US 7,779,438 B2
(45) Date of Patent: Aug. 17, 2010

(54) SYSTEM FOR PROVIDING VISIBLE MESSAGES DURING PVR TRICK MODE PLAYBACK

(75) Inventor: Colin John Davies, Fordingbridge (GB)

(73) Assignee: NDS Limited, Middlesex (GB)

( * ) Notice: Subject to any disclaimer, the term of this patent is extended or adjusted under 35 U.S.C. 154(b) by 448 days.

(21) Appl. No.: 10/529,026

(22) PCT Filed: Apr. 2, 2004

(86) PCT No.: PCT/GB2004/001454

§ 371 (c)(1),
(2), (4) Date: Mar. 21, 2006

(87) PCT Pub. No.: WO2005/096625

PCT Pub. Date: Oct. 13, 2005

(65) Prior Publication Data

US 2006/0168630 A1 Jul. 27, 2006

(51) Int. Cl.
*H04N 7/10* (2006.01)
*H04N 7/173* (2006.01)
*H04N 7/16* (2006.01)

(52) U.S. Cl. .............. 725/32; 725/34; 725/35; 725/36; 725/88; 725/89; 725/135

(58) Field of Classification Search ............. 725/32–36, 725/88; 386/68
See application file for complete search history.

(56) References Cited

U.S. PATENT DOCUMENTS

| | | | |
|---|---|---|---|
| 6,058,240 A | 5/2000 | McLaren | |
| 6,078,328 A | 6/2000 | Schumann et al. | |
| 6,104,441 A * | 8/2000 | Wee et al. | 375/240.15 |
| 6,185,340 B1 * | 2/2001 | Comer | 382/236 |
| 6,215,526 B1 | 4/2001 | Barton et al. | |
| 6,351,439 B1 * | 2/2002 | Miwa et al. | 369/47.18 |
| 6,373,534 B1 | 4/2002 | Yasuki et al. | |
| 6,438,168 B2 * | 8/2002 | Arye | 375/240.03 |
| 6,445,738 B1 | 9/2002 | Zdepski et al. | |
| 6,462,744 B1 * | 10/2002 | Mochida et al. | 345/543 |
| 6,563,936 B2 * | 5/2003 | Brill et al. | 382/100 |
| 6,621,866 B1 * | 9/2003 | Florencio et al. | 375/240.25 |
| 6,637,032 B1 * | 10/2003 | Feinleib | 725/110 |
| 6,735,253 B1 * | 5/2004 | Chang et al. | 375/240.16 |
| 6,798,893 B1 * | 9/2004 | Tanaka | 382/100 |

(Continued)

FOREIGN PATENT DOCUMENTS

WO 99/20045 4/1999

(Continued)

OTHER PUBLICATIONS

VITEC Multimedia: "A Step by Step Guide to Your First DVD-Video" *VITEC Multimedia* (1999) pp. 1-26, pp. 1-37 XP-002288023.

(Continued)

*Primary Examiner*—Son P Huynh
(74) *Attorney, Agent, or Firm*—Ladas and Parry LLP

(57) ABSTRACT

A method and system for embedding a message in compressed content comprising at least one key frame and at least one non-key frame, the method comprising embedding a message in the at least one key frame. Related methods and apparatus are also described.

20 Claims, 15 Drawing Sheets

U.S. PATENT DOCUMENTS

| | | | |
|---|---|---|---|
| 6,909,837 B1* | 6/2005 | Unger | 386/68 |
| 7,065,250 B1* | 6/2006 | Lennon | 382/224 |
| 7,154,560 B1* | 12/2006 | Chang et al. | 348/598 |
| 7,249,367 B2* | 7/2007 | Bove et al. | 725/60 |
| 2002/0028061 A1* | 3/2002 | Takeuchi et al. | 386/68 |
| 2002/0087402 A1* | 7/2002 | Zustak et al. | 705/14 |
| 2002/0144262 A1 | 10/2002 | Plotnick et al. | |
| 2002/0168009 A1* | 11/2002 | Sakaguchi | 375/240.16 |
| 2002/0176702 A1 | 11/2002 | Frantz | |
| 2003/0002672 A1 | 1/2003 | Beekmans et al. | |
| 2003/0037330 A1* | 2/2003 | Makofka | 725/32 |
| 2003/0088872 A1* | 5/2003 | Maissel et al. | 725/46 |
| 2003/0152363 A1 | 8/2003 | Jeannin et al. | |
| 2003/0154128 A1* | 8/2003 | Liga et al. | 705/14 |
| 2004/0034874 A1 | 2/2004 | Hord et al. | |
| 2004/0055088 A1* | 3/2004 | Heimbrock et al. | 5/618 |
| 2004/0096002 A1* | 5/2004 | Zdepski et al. | 375/240.26 |
| 2004/0223612 A1* | 11/2004 | Kamijoh et al. | 380/201 |
| 2006/0061065 A1* | 3/2006 | Haldemann | 280/628 |
| 2007/0226761 A1* | 9/2007 | Zalewski et al. | 725/32 |

FOREIGN PATENT DOCUMENTS

WO     02/32128     4/2002

OTHER PUBLICATIONS

SMPTE Standard "Television, Audio and Film-" *SMPTE 12M* (1999) pp. 1-21.

SMPTE Standard "Television-Splice Points for MPEG-2 Transport Streams" *SMPTE 312M* (1999) pp. 1-20.

"GOPchop—MPEG2 GOP-accurate editor" *GNU General Public License* (2003) p. 1-6 http://outflux.net/unix/software/GOPchop/.

"Powerful MPEG-2 Editor for the Desktop: MyFlix XE" *Mediaware Soluations* www.MediawareSolutions.com/MyFlixXY.html.

"Hardware:Matrox ships DigiSuite MAX real-time editing platforms" Emedia Magazine (2001) vol. 14, No. 10, pp. 18.

VITEC Multimedia: "A Step by Step guide to your first DVD-Video." (1999) *Vitec Multimedia*, XP002288023 Retrieved from the Internet: URL:www.vitecmn.com/doc/vitec_products/dvd_tbMAN.pdf.

* cited by examiner

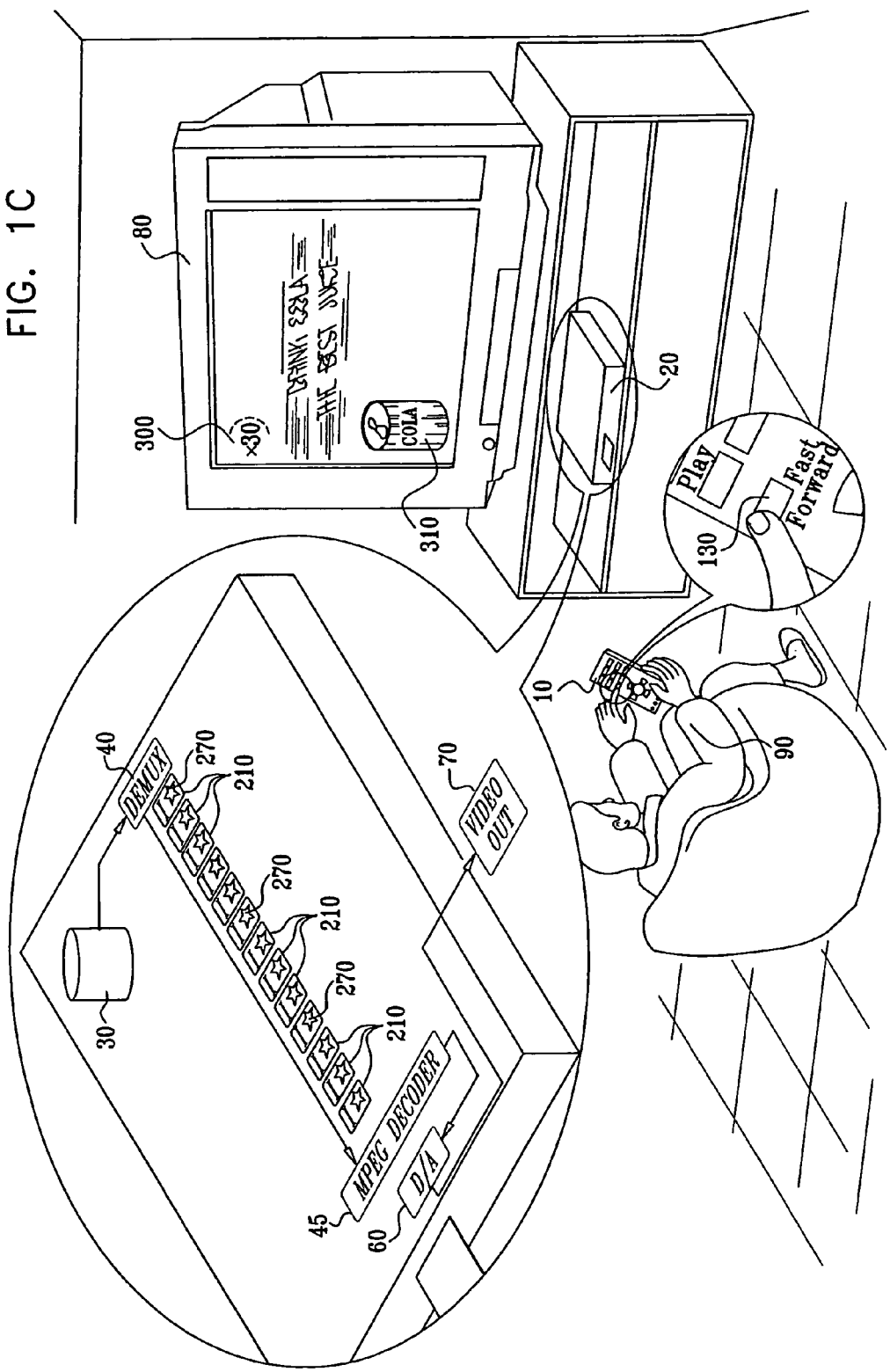

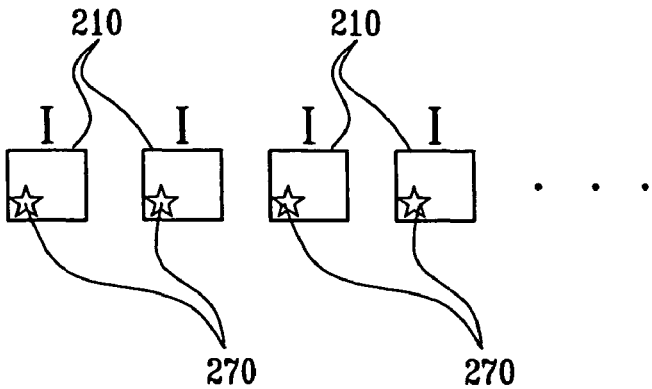

| FRAMES | | MESSAGE | | | | | | | | | | | | | | | |
|---|---|---|---|---|---|---|---|---|---|---|---|---|---|---|---|---|---|
| 0 | I | H | E | R | E | | I | S | | T | H | E | | T | E | S | T | | T | E | X | T |
| 1 | B | J | V | I | L | H | W | | O | D | J | R | A | X | D | D | N | P | O | G | J | G | T |
| 2 | B | H | B | J | W | Y | Q | V | | L | N | U | G | Z | H | P | P | E | W | H | D | I | J |
| 3 | P | Q | T | P | N | L | Q | H | Y | I | Y | | M | G | | O | E | W | A | G | H | X | M |
| 4 | B | S | G | W | R | L | Y | T | J | F | I | H | R | S | O | V | J | V | V | D | Y | K | N |
| 5 | B | A | X | W | T | J | R | T | J | C | M | F | W | N | | W | | U | F | H | Z | Y | U |
| 6 | P | M | E | O | G | H | G | | A | F | K | R | E | M | A | J | | L | E | E | X | I | E |
| 7 | B | E | Q | A | U | | K | D | Y | X | L | W | R | Y | L | J | X | R | Y | S | Q | R | O |
| 8 | B | G | Y | Q | A | J | P | D | J | Q | | V | B | T | F | X | J | H | E | Q | F | F | F |
| 9 | P | Y | C | G | N | H | W | H | R | V | W | Q | A | X | F | P | V | V | J | T | V | B | O |
| 10 | B | W | I | R | I | X | Y | C | Z | A | P | A | J | N | G | O | P | V | L | | L | G | G |
| 11 | B | E | | V | O | B | S | C | F | Y | S | V | V | F | F | I | J | N | G | J | W | A | G |
| 12 | I | H | E | R | E | | I | S | | T | H | E | | T | E | S | T | | T | E | X | T |
| 13 | B | J | O | H | V | L | B | G | X | Z | H | X | F | J | T | L | X | K | O | Z | I | K | D |

SYSTEM FOR PROVIDING VISIBLE MESSAGES DURING PVR TRICK MODE PLAYBACK

The present application is a 35 USC §371 filing of PCT/GB2004/001454, filed on 2 Apr. 2004.

FIELD OF THE INVENTION

The present invention relates to apparatus and methods for distributing video content, particularly but not exclusively advertisements, and more particularly but not exclusively to apparatus and methods for making advertisements available during personal video recorder trick mode playback.

BACKGROUND OF THE INVENTION

Published US Patent Application 2003/0002672 of Beekmans et al describes a method and system for detecting, in MPEG-2 encoded video data, a watermark. The detection occurs during high-speed copying of the video data. A bus spy selects independently coded frames from the video data and feeds the selected frames to a watermark detector. By only supplying some of the frames to the watermark detector, the average input data rate for the watermark detector is lower than the data rate during high-speed copying.

U.S. Pat. No. 6,078,328 to Schumann et al describes a system and method in which graphics are compressed in the same digital format as that of a target video. The graphics are combined with the target video, on the fly, by an application performing frame modification or overlay techniques. In a preferred embodiment, the compressed video image format conforms to an MPEG-2 compression standard. Modifying an I-frame produces a base image, and MPEG-2 elements are formed either by modifying the I-frame or overlaying the I-frame with one or more P-frames.

Published US Patent Application 2002/0144262 of Plotnick et al describes a method and system for presenting viewers with an alternative brief version of a recorded advertisement when they fast forward through or skip (or any other trick play event) the recorded advertisement. The alternative advertisement may be displayed instead of or in conjunction with the recorded advertisement. The alternative brief version of the advertisement may be a marketing message that is a static screen presenting a logo or a portion of the recorded advertisement, or may be a condensed version of the actual advertisement.

The following documents from the MPEG-2 standard describe syntax and methods which may be relevant to understanding the present invention:

syntax of a transmitted digital multimedia or other data signal: ISO/IEC 13818-1;

syntax of an encoded digital video signal: ISO/IEC 13818-2;

Society of Motion Picture and Television Engineers (SMPTE) document 312M, "Splice points for MPEG-2 Transport Streams", describes "splice points" in MPEG-2 transport streams, which are inserted by a headend to facilitate smooth splicing between steams.

SMPTE document 12M, "Television, Audio and Film—Time Control Code", specifies a digital time and control code for use in television, film, and accompanying audio systems.

MPEG-2 editors are well known in the art, and are available commercially in a variety of cost ranges as well as for download on the Internet. For example, and without limiting the generality of the foregoing, Mediaware Solutions provides MyFlix XE, which is described on the Internet at: www.MediawareSolutions.com/MyFlixXE.html, for desktop editing of MPEG-2. The Matrox Video Products Group markets the DigiSuite MAX line of real-time MPEG-2 editing platforms. The GOPChop MPEG-2 editor is downloadable at outflux.net/unix/software/GOPchop/ under the GNU General Public License.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, seeks to provide an improved method of ensuring that viewers who fast forward or reverse past advertisements still are presented advertisements for viewing. In accordance with preferred embodiments of the present invention, advertisements are embedded in compressed video key frames.

The widespread adoption of personal video recorder (PVR) devices is expected to create a world where people view most content off of a storage disk rather than viewing content which is broadcast live. Many PVR users fast forward through advertisement breaks. As more and more viewers gain the ability to skip advertisements, an impact on current advertising business models is expected.

The ability of PVRs to display video at speeds other than normal speeds is known in the art as "trick modes". In certain types of trick mode playback, key frames only are displayed. In accordance with preferred embodiments of the present invention, advertisements are preferably embedded in key frames. Embedding the advertisement in key frames in such a way that, when only the key frames are played back, the embedded advertisement will preferably become visible. On the other hand, the advertisement preferably remains hidden when playback occurs at normal speed.

By contrast, prior art approaches rely on flagging advertisements for display, or on applying rules to generate alternative advertisements.

The term "key frame" is defined below, with reference to FIG. 3.

In an integrated digital PVR, content is stored on disk, typically in digital compressed form. Typically, the content is stored on the disk in the same form in which the content was broadcast.

A PVR can perform fast forward in one of two modes:

Smooth trick mode—at low fast forward speeds, such as 2 or 4 times normal playback speed, a video decoder typically quickly decodes every video frame of content but only actually displays every second or fourth frame.

Key frame trick mode—at high fast forward speeds the video decoder may not have the processing or data bandwidth to perform the smooth trick mode approach described above. Instead, the video decoder identifies key frames in the compressed video and decodes and displays only the key frames.

During fast forward, the advertising messages contained in a conventional television advertisement are not conveyed to viewers. Since only key frames are displayed during high speed fast forward, an advertisement embedded in key frames as described below, becomes visible to viewers.

There is thus provided in accordance with a preferred embodiment of the present invention a method for embedding a message in compressed content including at least one key frame and at least one non-key frame, the method including embedding a message in the at least one key frame.

Further in accordance with a preferred embodiment of the present invention the embedding includes embedding the message substantially only in the at least one key frame.

Still further in accordance with a preferred embodiment of the present invention the at least one key frame includes a plurality of key frames.

Additionally in accordance with a preferred embodiment of the present invention the embedding includes embedding the message in each of the plurality of key frames.

Moreover in accordance with a preferred embodiment of the present invention the embedding includes embedding the message in only some of the plurality of key frames.

Further in accordance with a preferred embodiment of the present invention providing non-compressed content, and producing the compressed content from the non-compressed content, wherein the producing includes the embedding.

Still further in accordance with a preferred embodiment of the present invention providing the compressed content, wherein the embedding includes identifying the at least one key frame, and embedding the message in the at least one identified key frame.

Additionally in accordance with a preferred embodiment of the present invention distributing a stream of compressed content onto a storage medium of an end-user unit, the content including a plurality of key frames wherein each individual key frame includes the embedded message.

Moreover in accordance with a preferred embodiment of the present invention the storage medium includes a removable storage medium.

Further in accordance with a preferred embodiment of the present invention the storage medium is external to the end-user unit.

Still further in accordance with a preferred embodiment of the present invention the storage medium includes a prerecorded medium.

Additionally in accordance with a preferred embodiment of the present invention the compressed content is compressed with MPEG-2 compression.

Moreover in accordance with a preferred embodiment of the present invention the key frame includes an I-frame.

There is also provided in accordance with another preferred embodiment of the present invention receiving, at a consumer device, compressed content, the compressed content including a plurality of video frames, the video frames including a plurality of key frames and a plurality of non-key frames, at least some of the plurality of key frames including an embedded message, selecting at least one of the plurality of key frames from the compressed content, thereby producing at least one selected key frame, the embedded message being included in the at least one selected key frame, producing non-compressed content from the selected at least one of the plurality of key frames, and outputting the non-compressed content including the embedded message.

Further in accordance with a preferred embodiment of the present invention the plurality of video frames is received from a broadcast video stream.

Still further in accordance with a preferred embodiment of the present invention the plurality of video frames is received from a digital recording.

Additionally in accordance with a preferred embodiment of the present invention the digital recording is pre-recorded on a medium.

Moreover in accordance with a preferred embodiment of the present invention the compressed content is compressed with MPEG-2 compression.

Further in accordance with a preferred embodiment of the present invention the plurality of key frames including an embedded message includes a plurality of I-frames.

There is also provided in accordance with still another preferred embodiment of the present invention digital compressed content, the content including a plurality of video frames, the video frames including at least one key frame and one non-key frame, the at least one key frame including an embedded message.

Further in accordance with a preferred embodiment of the present invention the embedded message is embedded substantially only in the at least one key frame.

Still further in accordance with a preferred embodiment of the present invention the at least one key frame including an embedded message includes a plurality of key frames.

Additionally in accordance with a preferred embodiment of the present invention the compressed content is compressed with MPEG-2 compression.

Moreover in accordance with a preferred embodiment of the present invention the at least one key frame including an embedded message is an I-frame.

Further in accordance with a preferred embodiment of the present invention the medium includes a DVD.

There is thus provided in accordance with a preferred embodiment of the present invention a message embedder operative to embed a message in compressed content including at least one key frame and at least one non-key frame, the embedder embedding the message in the at least one key frame.

There is thus provided in accordance with a preferred embodiment of the present invention embedding a message in compressed content including at least one key frame and at least one non-key frame, the embedding including embedding the message in the at least one key frame, receiving the compressed content at a consumer device, the compressed content including the at least one key frame including the embedded message, selecting at least one key frame from the compressed content, thereby producing at least one selected key frame, the embedded message being included in the at least one selected key frame, producing non-compressed content from the at least one selected key frame, and outputting the non-compressed content including the embedded message.

There is also provided in accordance with another preferred embodiment of the present invention an embedder operative to embed a message in compressed content including at least one key frame and at least one non-key frame, wherein the embedder embeds the message in the at least one key frame, a receiver operative to receive the compressed content at a consumer device, the compressed content including the at least one key frame including the embedded message, a selector operative to select at least one key frame from the compressed content, thereby producing at least one selected key frame, the embedded message being included in the at least one selected key frame, a producer operative to produce non-compressed content from the at least one selected key frame, and an outputter operative to output the non-compressed content including the embedded message.

There is also provided in accordance with still another preferred embodiment of the present invention a consumer device operative to receive compressed content, the compressed content including a plurality of video frames, the video frames including a plurality of key frames and a plurality of non-key frames, at least some of the plurality of key frames including an embedded message, a selector included in the consumer device operative to select at least one of the plurality of key frames from the compressed content, thereby producing at least one selected key frame, the embedded message being included in the at least one selected key frame, a producer included in the consumer device operative to produce non-compressed content from the selected at least one of the plurality of key frames, and an outputter included in the consumer device operative to output the non-compressed content including the embedded message.

BRIEF DESCRIPTION OF THE DRAWINGS

The present invention will be understood and appreciated more fully from the following detailed description, taken in conjunction with the drawings in which:

FIGS. 1A-D are simplified partly pictorial, partly block diagram illustrations of a system for viewing advertisements during PVR trick modes, constructed and operative in accordance with a preferred embodiment of the present invention;

FIG. 4A is a simplified illustration of the exemplary stream of video frames of FIG. 3, when viewed during a trick mode playout;

FIG. 4B is a text based example of a message embedded in accordance with the system of FIGS. 1A-1D;

DETAILED DESCRIPTION OF A PREFERRED EMBODIMENT

Figure 1A:
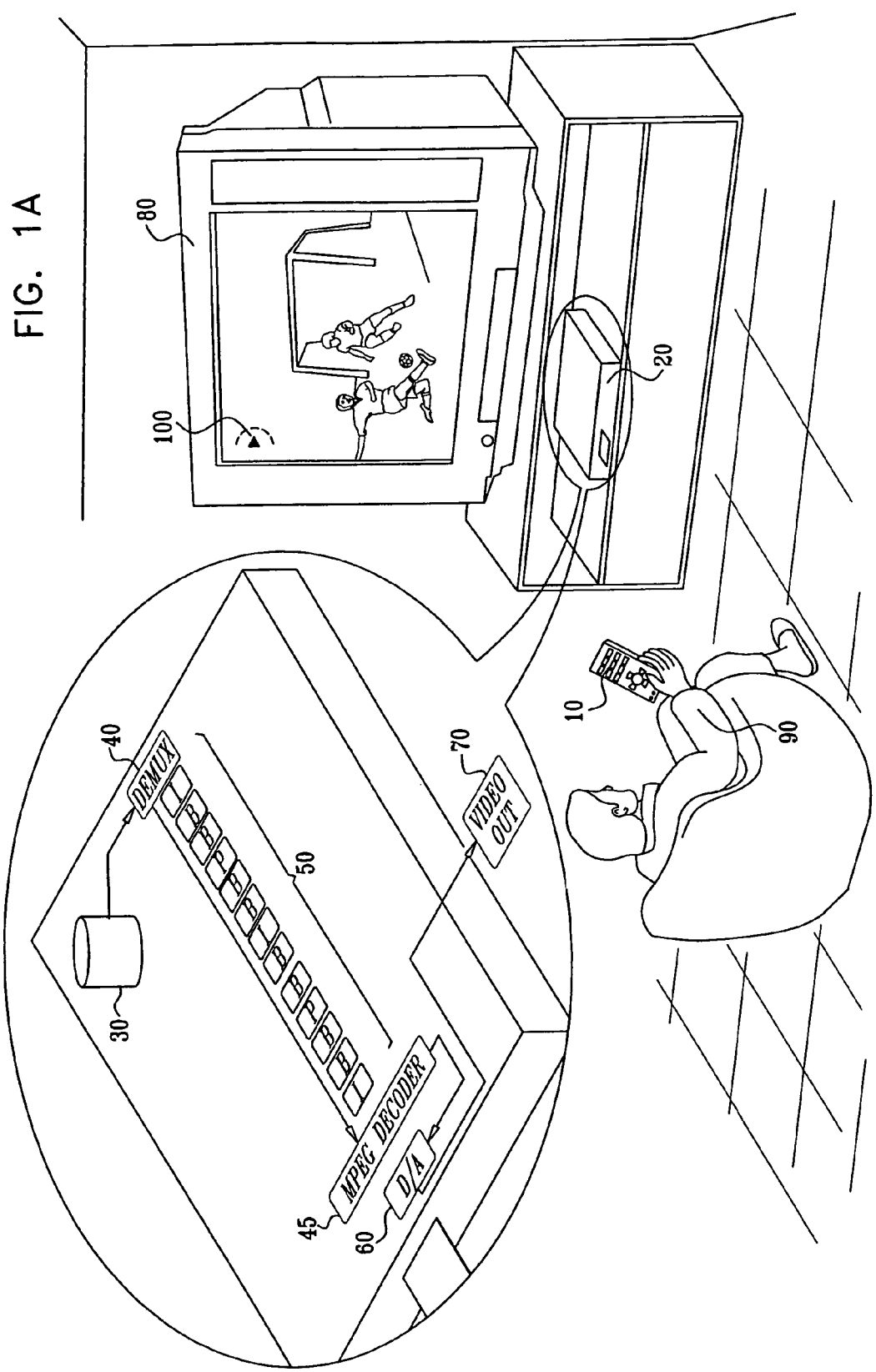

Reference is now made to FIGS. 1A-1D, which are simplified partly pictorial partly block diagram illustrations of a system for viewing advertisements during personal video recorder (PVR) trick modes, constructed and operative in accordance with a preferred embodiment of the present invention. It is appreciated that the present invention, in preferred embodiments thereof, is operative in other trick modes, such as, for example, and without limiting the generality of the foregoing, rewind.

The system of FIGS. 1A-1D preferably comprises a remote control 10 or comparable device, operative to send signals to a PVR 20, which is also preferably comprised in the system of FIGS. 1A-1D. The PVR 20, preferably implemented in an appropriate combination of hardware and/or software, preferably comprises a storage medium 30, a demultiplexor 40, an MPEG decoder 45, and digital/analog converters 60.

The PVR 20 receives as input a digital stream (not shown), comprising compressed multiplexed video, audio and data, as is well known in the art. The PVR 20 preferably stores the digital stream on the storage medium 30. At appropriate times, and usually in response to a user-initiated input, the storage medium 30 preferably outputs a stored digital stream to the demultiplexor 40. The demultiplexor 40 preferably sends the demultiplexed stored digital stream 50 as individual frames of video and audio to the MPEG decoder 45. The MPEG decoder 45 decodes the stored digital stream and sends the individual frames of video and audio to digital/analog converters 60. The digital/analog converters 60 preferably output video 70 and audio to a television 80. Typically, the television 80 is connected to the PVR 20 with an appropriate cable (not shown), as is well known in the art.

Throughout the present specification and claims, MPEG-2 is described by way of example only and is not meant to be limiting. The system and method described in the present invention may also be used in video coding schemes that include key frames. Examples of video coding schemes that include key frames other than MPEG-2 include, but are not limited to MPEG-1 video (ISO/IEC 11172-2), MPEG-4 visual (ISO/IEC 14496-1), and MPEG-4 advanced visual coding (ISO/IEC 14496-10).

It is appreciated that each of the following subcombinations comprises an alternative preferred embodiment of the present invention, without the other elements shown in FIG. 1A:

1. the remote control 10, the PVR 20, the storage medium 30, the demultiplexor 40, the digital stream 50, the MPEG decoder 45, the digital/analog converters 60 and the output video 70;
2. the remote control 10, the PVR 20, the storage medium 30, the demultiplexor 40, the MPEG decoder 45, the digital stream 50, and the output video 70;
3. the PVR 20, the storage medium 30, the demultiplexor 40, the digital stream 50, the MPEG decoder 45, the digital/analog converters 60, the output video 70 and the television 80;
4. the PVR 20, the storage medium 30, the demultiplexor 40, the digital stream 50, the MPEG decoder 45, the output video 70 and the television 80;
5. the PVR 20, the storage medium 30, the demultiplexor 40, the digital stream 50, the MPEG decoder 45, the digital/analog converters 60 and the output video 70;
6. the PVR 20, the storage medium 30, the demultiplexor 40, the digital stream 50 the MPEG decoder 45, and the output video 70.

It is appreciated that in some preferred implementations of the present invention, the storage medium 30 may comprise a removable storage medium, and/or an external storage medium.

The operation of the system of FIGS. 1A-1D is now briefly described. Referring specifically to FIG. 1A, a person 90 watches the television 80. The person 90 holds the remote control 10, which is operative to send signals to the PVR 20. The person 90 watches a television program, shown here as a soccer game, on the television 80. A symbol, for example, a triangular wedge 100, preferably appears on the television 80. The triangular wedge 100 indicates that the soccer game has been stored on the storage medium 30 comprised in the PVR 20, and is being played back from the storage medium 30.

A video stream stored on the storage medium is sent, at appropriate times, to the demultiplexor 40. Individual video frames comprising a demultiplexed video stream 50 are preferably streamed from the demultiplexor 40 to the MPEG decoder 45. Demultiplexed decoded video is sent from the MPEG decoder 45 to the digital/analog converters 60. The individual frames comprised in a demultiplexed decoded video stream 50 preferably comprise key frames and predictive frames, as described below with reference to FIG. 3.

Throughout the present specification and claims the processing of video is discussed for the sake of simplicity of description, it being appreciated that the PVR 20 preferably inputs, outputs, stores and processes video, audio and data. It is further appreciated that the sequence and number of frames shown in the figures of the present disclosure are purely for illustrative purposes, and not meant to be limiting. For example, and without limiting the generality of the foregoing, the stream 50 in FIG. 1A begins with an I-frame followed by two B-frames, a P-frame and finally another two B-frames, for a total of six frames. The sequence of I, B, B, P, B, B is given purely for illustrative purposes, and not meant to be limiting. Throughout the figures of the present application, I-frames are denoted as rectangles marked with the letter "I", P-frames are denoted as rectangles marked with the letter "P", and B-frames are denoted as rectangles marked with the letter "B". I, P and B frames are described in more detail below with reference to FIG. 3.

The video output 70 of the PVR 20 comprises a stream of individual frames.

In the example given in FIGS. 1A-1D, an encoded video stream may originate from a broadcast source, such as, but without limiting the generality of the foregoing, a cable or satellite broadcaster. It is appreciated that the video may alternatively be a video that was pre-recorded on a medium, such as, but without limiting the generality of the foregoing, a DVD or a digital tape.

Figure 1B:
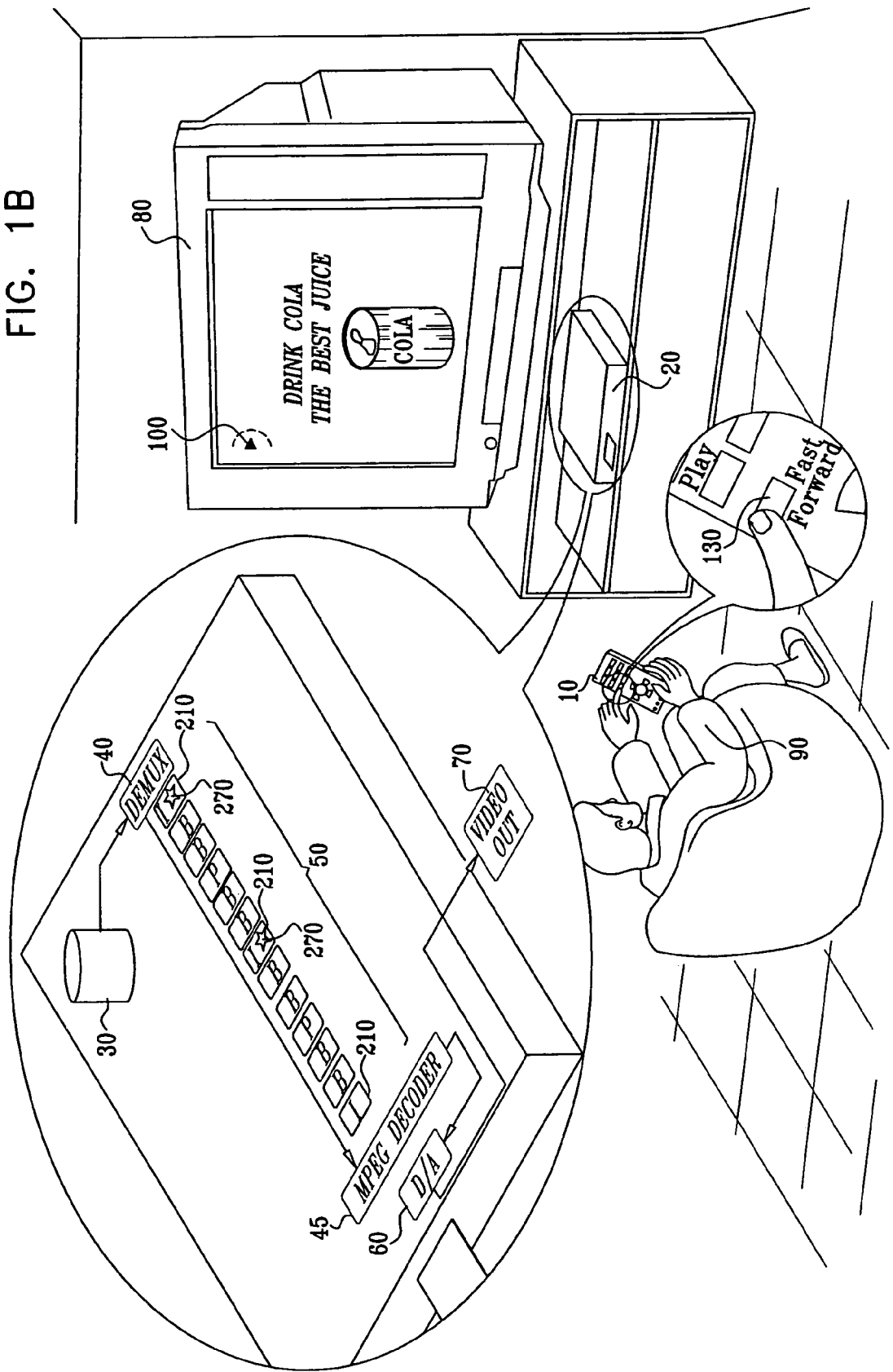

Reference is now made specifically to FIG. 1B. FIG. 1B depicts a continuation of the scene portrayed in FIG. 1A. The television 80 now begins to display an advertisement. The person 90 presses fast forward 130 on the remote control 10, in order to skip over the advertisement, and to view the continuation of the soccer game after the advertisements. Fast forwarding is given as an example of one way a person may attempt to skip advertisements, and is not meant to be limiting.

Video continues to stream from the storage medium 30 to the demultiplexor 40. Demultiplexed video frames comprised in the stream of video frames 50, comprising I-frames 210, now preferably comprise an additional element: a message 270, depicted here as a star, has preferably been added to the upcoming I-frames, as explained below with reference to FIG. 3. The demultiplexed video frames stream into the MPEG decoder 45. Decoded demultiplexed video frames are streamed into the digital/analog converter 60, and video 70 is output, preferably to the television 80.

Reference is now made specifically to FIG. 1C. FIG. 1C depicts a continuation of the scene portrayed in FIGS. 1A and 1B. As a result of the person 90 pressing the fast forward button 130 on the remote control 10, the remote control 10 signals the PVR 20 to begin to stream video from the storage medium 30 to the demultiplexor 40 using key frame trick mode. I-frames 210 are preferably now the only type of video frames streamed from the demultiplexor 40 to the MPEG decoder 45. Decoded demultiplexed video frames are streamed into the digital to analog converter 60. Video 70 is preferably streamed out of the PVR 20 to the television 80.

The television 80 now displays a symbol 300 reading ×30 indicating that the video is fast forwarding at thirty times the normal playback speed. It is appreciated that various fast forward speeds are implemented in commercially available STB/PVRs, and that thirty times the normal playback speed is used as a non-limiting example. As a consequence of the message 270 being preferably embedded in a plurality of I-frames 210, a corresponding graphical element 310 appears on the television 80. Those skilled in the art will appreciate that even if not every I-frame has an embedded image, if enough I-frames have an embedded image, the embedded image will be perceivable to the eye. Conversely, as will be explained in greater detail below with reference to FIG. 3, an image in a single frame will not be perceivable to the eye. Continued presence of an image over several frames, preferably comprising continuous frames, makes an image visible.

Figure 1D:
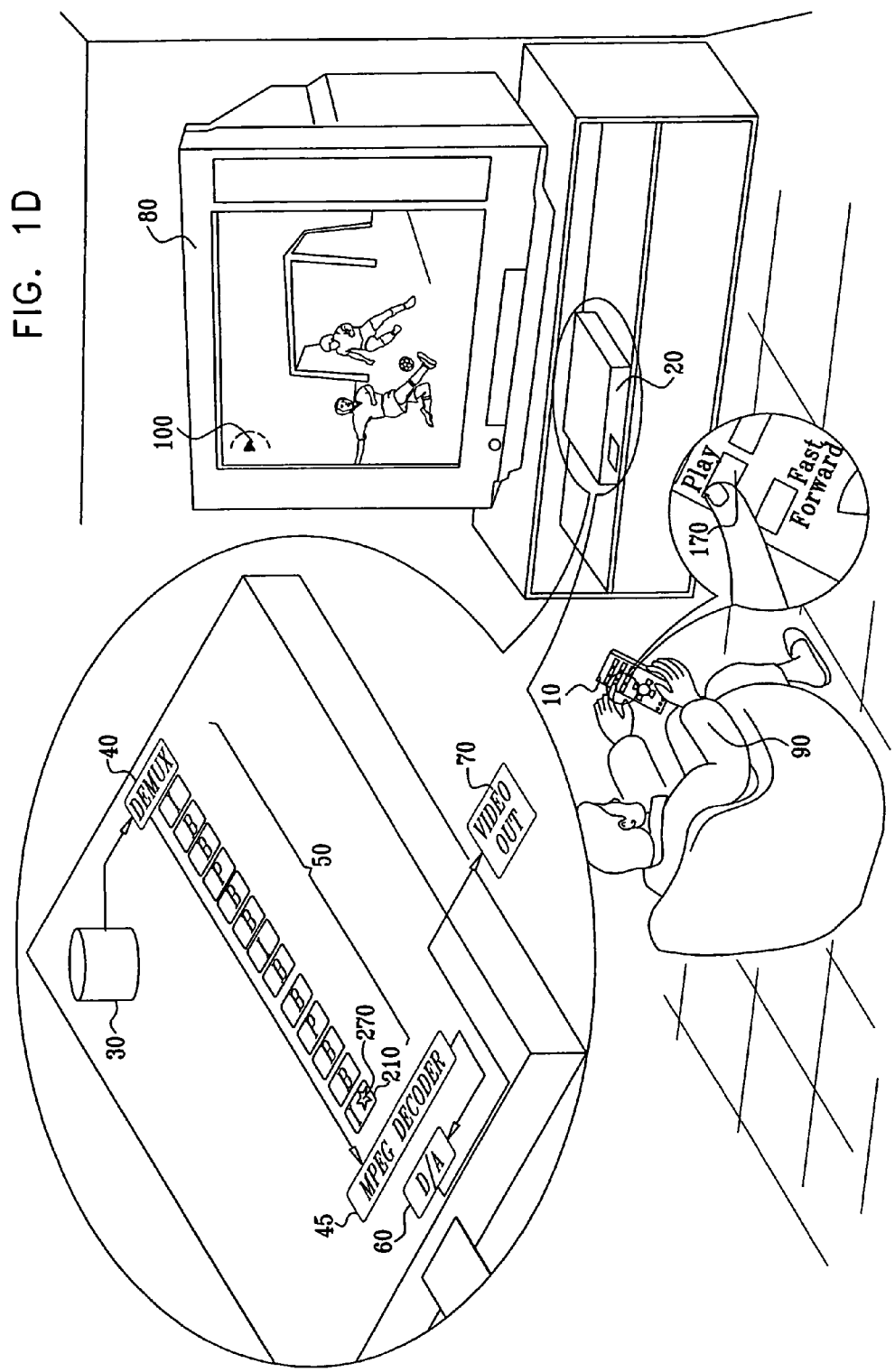

Reference is now made specifically to FIG. 1D. FIG. 1D depicts a continuation of the scene portrayed in FIGS. 1A-1C. Once the advertisement ends, the person 90 presses play 170 on the remote control 10. Pressing play 170 on the remote control 10 signals the PVR 20 to stop fast forwarding video and to begin to stream video from the storage medium 30 to the demultiplexor 40 at normal speed. The demultiplexed digital stream 50 comprises a plurality of video frames. Among the video frames comprised in the demultiplexed digital stream 50 is the final I-frame 210 which comprises an embedded message 270. The demultiplexed digital stream 50 streams from the demultiplexor 40 to the MPEG decoder 45. Decoded demultiplexed video frames are streamed into the digital/analog converter 60. The digital/analog converter 60 outputs video 70 to the television 80.

The soccer game is once again seen on the television 80. The triangular wedge symbol 100 appears in the upper left corner of the television 80. The triangular wedge 100 indicates that the soccer game is being played back from the storage medium 30 at normal speed.

Figure 2:
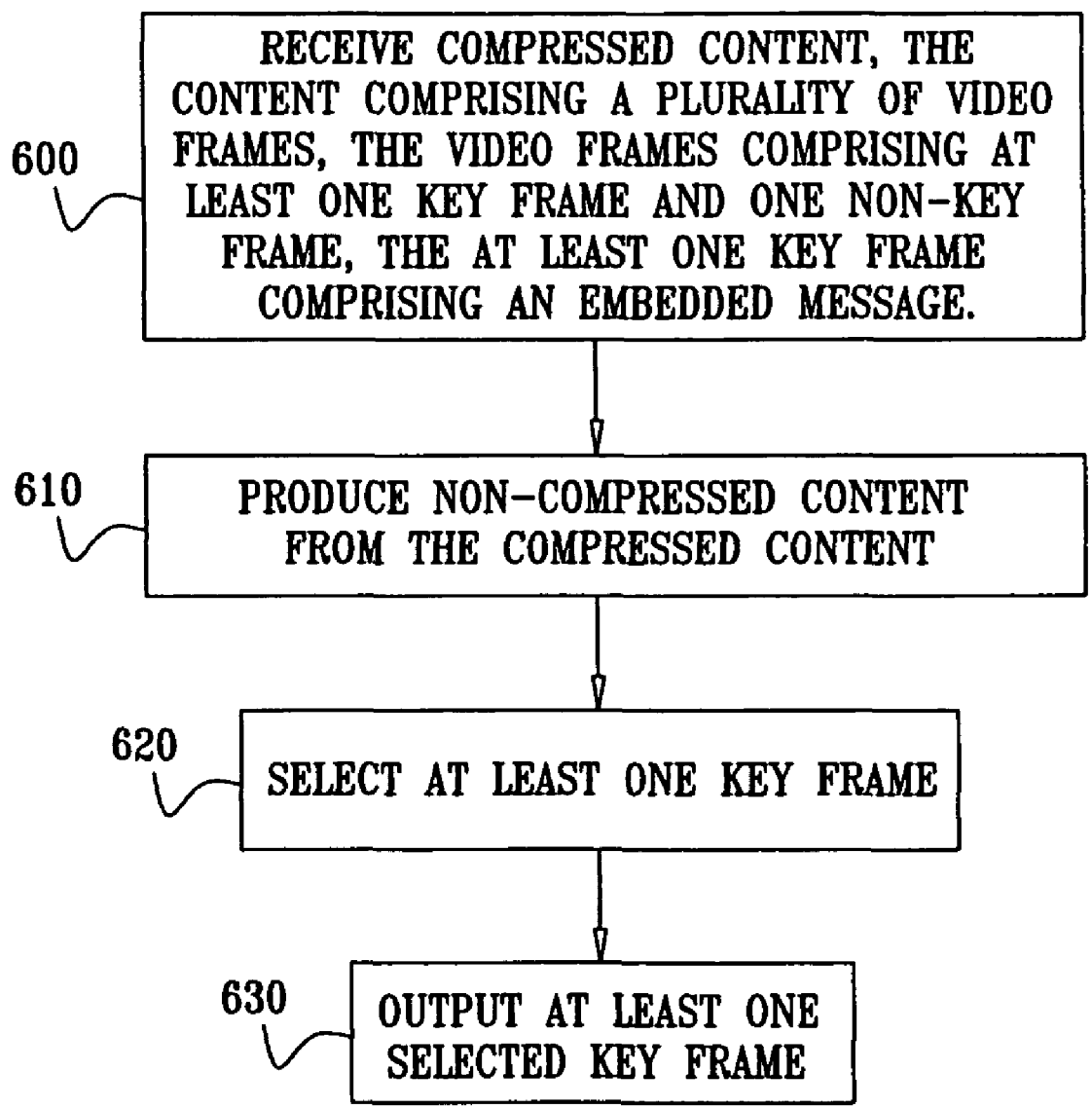
FIG. 2 is a simplified flowchart illustration of a preferred method of operation of the system of FIGS. 1A-1D.

Reference is now made to FIG. 2, which is a simplified flowchart illustration of a preferred method of operation of the system of FIGS. 1A-1D. The method of FIG. 2 preferably comprises the following steps:

A consumer device receives compressed content (step 600), the content comprising a plurality of video frames, the video frames comprising at least one key frame and one non-key frame, the at least one key frame comprising an embedded message.

The consumer device produces non-compressed content from the compressed content (step 610).

The consumer device selects the at least one key frame. The at least one key frame preferably comprises the embedded message (step 620).

The consumer device outputs the at least one key frame selected in step 620 (step 630).

Figure 3:
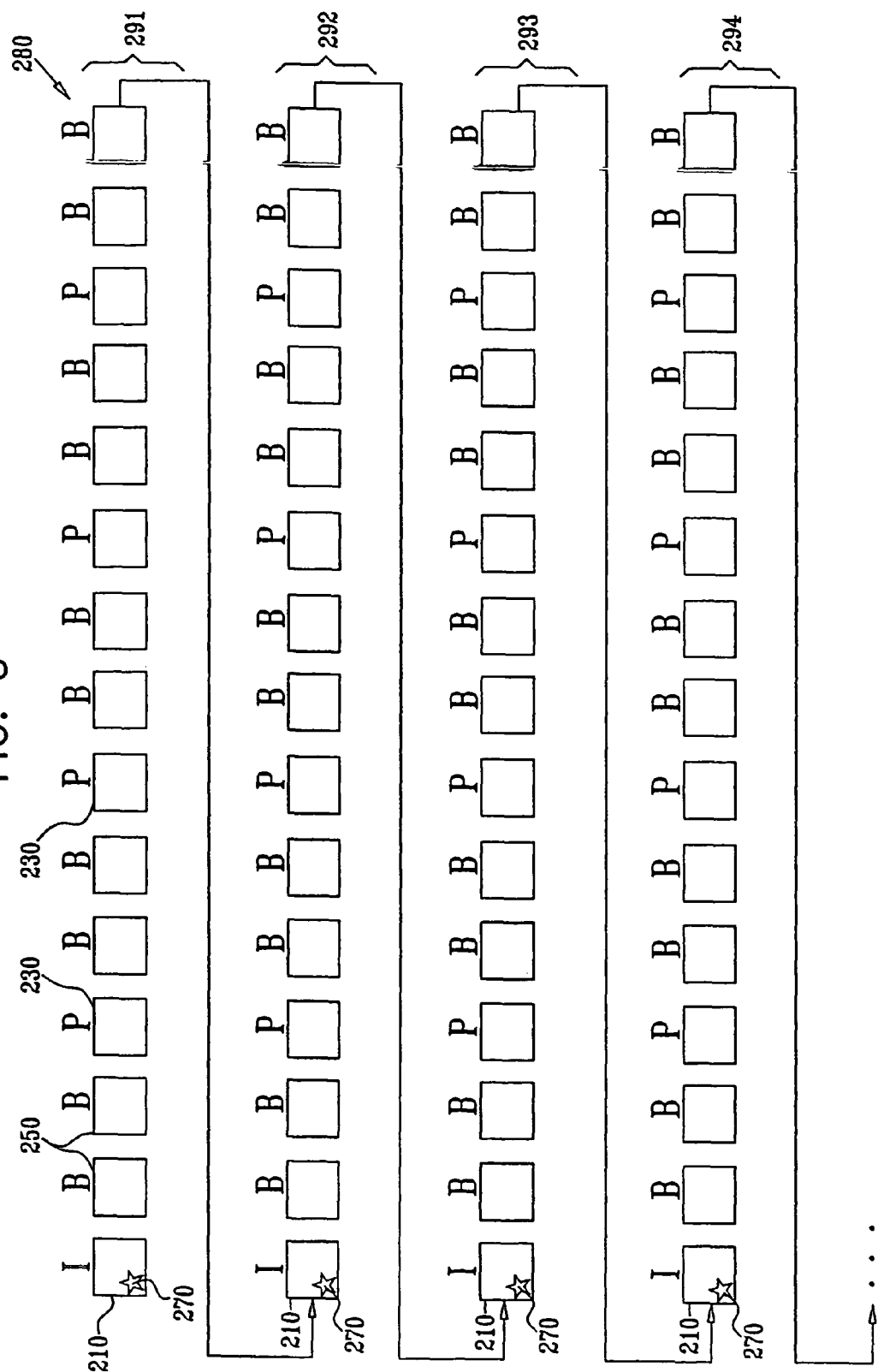
FIG. 3 is a simplified illustration of an exemplary stream of video frames, useful for understanding the system of FIGS. 1A-1D.

Reference is now made to FIG. 3, which is a simplified illustration of an exemplary stream 280 of video frames, useful for understanding the system of FIGS. 1A-1D. The exemplary stream 280 preferably comprises individual video frames 210, 230, 250, preferably comprising MPEG-2 video key frames and predicted frames. Specifically, key frames, referred to in the MPEG-2 standard as "intra-coded" frames, or I-frames 210, preferably comprise frames that are coded using purely intra-coding, with reference to no other field or frame information. I-frames are preferably used as a reference for compressing other frames.

Within the MPEG-2 specification, there are two types of predictive frames: P-frames 230 and B-frames 250. For simplicity of depiction, only some P-frames and some B-frames are shown with reference numerals in FIG. 3. A P-frame, more formally referred to as a "predicted" frame, is a frame produced using forward prediction. P-frames preferably comprise predictions that are coded using motion-compensated predictions from either previous I-frames or previous P-frames. The P-frame is used as a reference for future P- or B-frames. A B-frame, or "bi-directional" frame is a bi-directionally predictive coded picture/frame: a picture that is coded using motion-compensated prediction from previous and/or future I-frames or P-frames. B-frames are not used in any prediction.

It is appreciated that although the present invention is described herein specifically with reference to MPEG-2, the present invention, in preferred embodiments thereof, is operative in any appropriate compression system based on key frames and predictive-frames. The case of MPEG-2 is described by way of example only and is not meant to be limiting.

It is also appreciated that a subcombination comprising only a data stream, such as, for example, and without limiting the generality of the foregoing, the exemplary stream of FIG. 3, may comprise a preferred embodiment of the present invention.

Typically, in television transmission, a group of pictures, preferably comprising a key or I-frame followed by a series of predicted frames, comprises either 12 frames in a 25 frame per second signal, or 15 frames in a 30 frame per second signal. It is appreciated that a new sequence starting with an I-frame may be forced if there is a change at the transmission source. For example, if a camera broadcasting video were suddenly moved, even though the video frames are in the middle of a group of pictures, a new I-frame would be forced.

In the exemplary stream 280 of FIG. 3, a stream of video frames is shown. The exemplary stream 280 comprises four groups of pictures 291, 292, 293, 294, each group of pictures comprising one I-frame 210 followed by 14 predictive frames comprising P-frames 230 and B-frames 250. The four groups of pictures 291, 292, 293, 294 of FIG. 3, taken together, represent about 2 seconds of video. The four I-frames 210 of FIG. 3 each comprise a message 270, depicted in FIG. 3 as a star. Any appropriate image or combination of images may be embedded in the I-frame, using techniques well known in the art. For example, and without limiting the generality of the foregoing, images may be embedded in I-frames using graphical editors in conjunction with any of the MPEG editors mentioned above. When the video of the exemplary stream of FIG. 3 is viewed, each I-frame 210 is only visible on the television 80 (seen in FIG. 1A) for about 0.033 seconds (assuming a 30 frame per second signal) or 0.04 seconds (assuming a 25 frame per second signal). The human eye will not detect the message 270 when it appears on screen for such a short time.

The embedded message 270 on the plurality of I-frames 210 of FIG. 3 may preferably be embedded on one of the plurality of I-frames 210 in one of two ways. Either the message 270 is embedded on one of the plurality of I-frames 210 in a nonreal-time fashion, using an offline MPEG-2 editor, or the message is embedded in real-time, preferably during MPEG-2 encoding, by an MPEG-2 encoder. The case of MPEG-2 is described by way of example only and is not meant to be limiting.

As is known in the art, there are two techniques used by PVRs for fast forwarding:

Smooth trick mode—at low fast forward speeds, such as 2 or 4 times normal playback speed, the PVR video decoder preferably quickly decodes every video frame of content but only actually displays every second or fourth frame.

Key frame trick mode—at high fast forward speeds the video decoder may not have the processing or data bandwidth to perform the smooth fast forward approach described above. Instead, the video decoder preferably identifies key frames in the compressed video and preferably decodes and displays only the key frames.

Reference is now made to FIG. 4A, which is a simplified pictorial illustration of the exemplary stream of video frames of FIG. 3 when viewed during a trick mode playout. When the exemplary stream of FIG. 3 is played out using key frame trick mode, only the I-frames 210 will preferably be selected for play out. In FIG. 4A, only the I-frames 210 of FIG. 3 appear. The resultant new stream of I-frames preferably comprises I-frames 210 in which the message 270 has been embedded. It is appreciated that if the position of the message 270 changes over several I-frames 210, the message 270 will appear to move, when viewed on the television 80 as explained below with reference to FIG. 5A. It is further appreciated that other visual effects may be achieved using techniques known in the art, for example, and without limiting the generality of the foregoing, by changing the appearance, position and/or shading of the message 270, or by dividing the message 270.

Figure 4C:
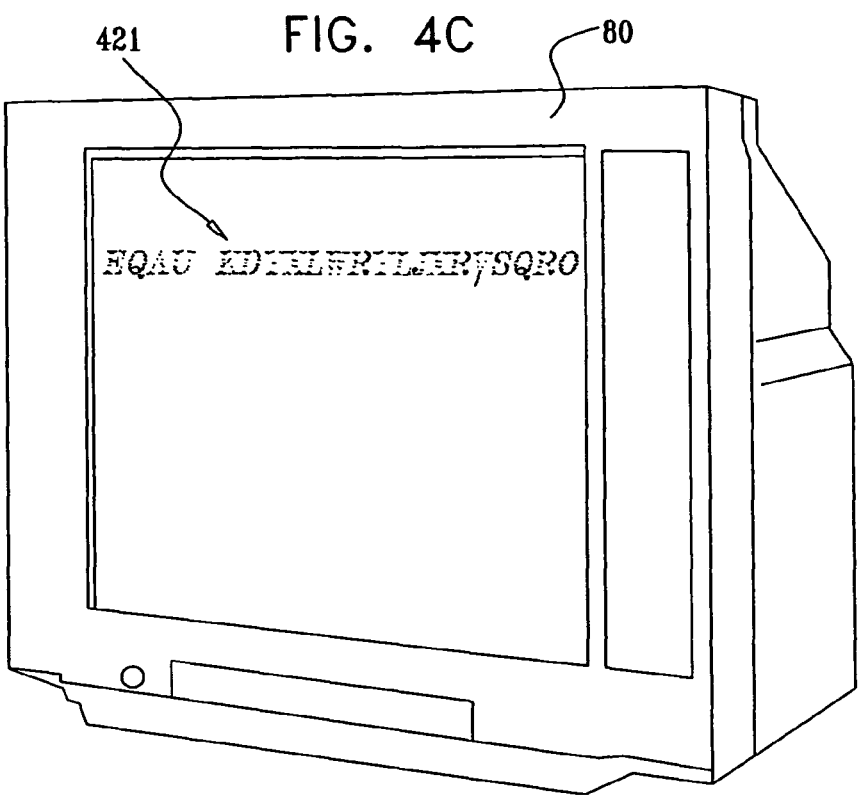
FIG. 4C is a text based example of a sample predicted frame selected out of the example of FIG. 4B.

Reference is now made to FIG. 4B, which is a text based example of a message embedded in accordance with the system of FIGS. 1A-1D. FIG. 4B comprises a plurality of frames 411 comprising frames 0-13. For eases of reference, frame number is shown in the left-most column 413 of FIG. 4B. The plurality of frames 411 are identified as either I-, P- or B-frames in the second column from the left 415. A message, "HERE IS THE TEST MESSAGE" is comprised in the I-frames 419 of the plurality of frames 411 of FIG. 4B. The message is random in all frames except for frames 0 and 12. Frames 0 and 12 are encoded as I-frames 419. When the plurality of frames 411 are viewed at normal play speed, a viewer perceives only random characters. One non-I-frame 421, frame 7, a B-frame, is pointed out in order to provide a non-limiting example within the context of FIG. 4B, of what appears on a television when a non-I-frame 421 is viewed, as will be explained below, with reference to FIG. 4C.

Reference is now made to FIG. 4C which is a text based example of a sample predicted frame selected out of the example of FIG. 4B. In FIG. 4C, text of the non-I-frame 421 appears on the television 80. The viewer perceives the text as blurry, as a single frame is only viewable on the television for a fraction of a second, as is explained above with reference to FIG. 3. It is appreciated that the text of FIG. 4C is given by example only, and any single non-I-frame of the text based example of FIG. 4B would be an equally valid example for FIG. 4C.

Figure 4D:
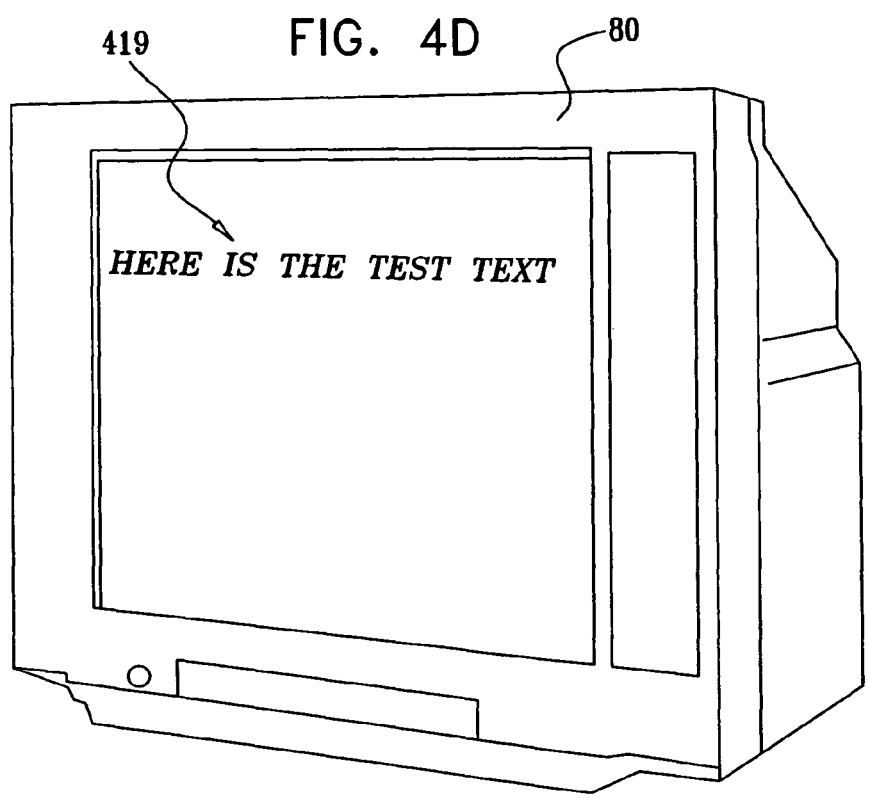
FIG. 4D is a text based example of only I-frames selected out of the example of FIG. 4B.

Reference is now made to FIG. 4D, which is a text based example of only I-frames selected out of the example of FIG. 4B. When only the I frames 419, comprising frames 0 and 12 of FIG. 4B are played back, for example, and without limiting the generality of the foregoing, in PVR trick mode, the message, embedded in accordance with the system of FIGS. 1A-1D, "HERE IS THE TEST TEXT" is displayed. It is appreciated that the viewer perceives the message, "HERE IS THE TEST TEXT", clearly as all of the I frames contain the same message.

Figure 4E:
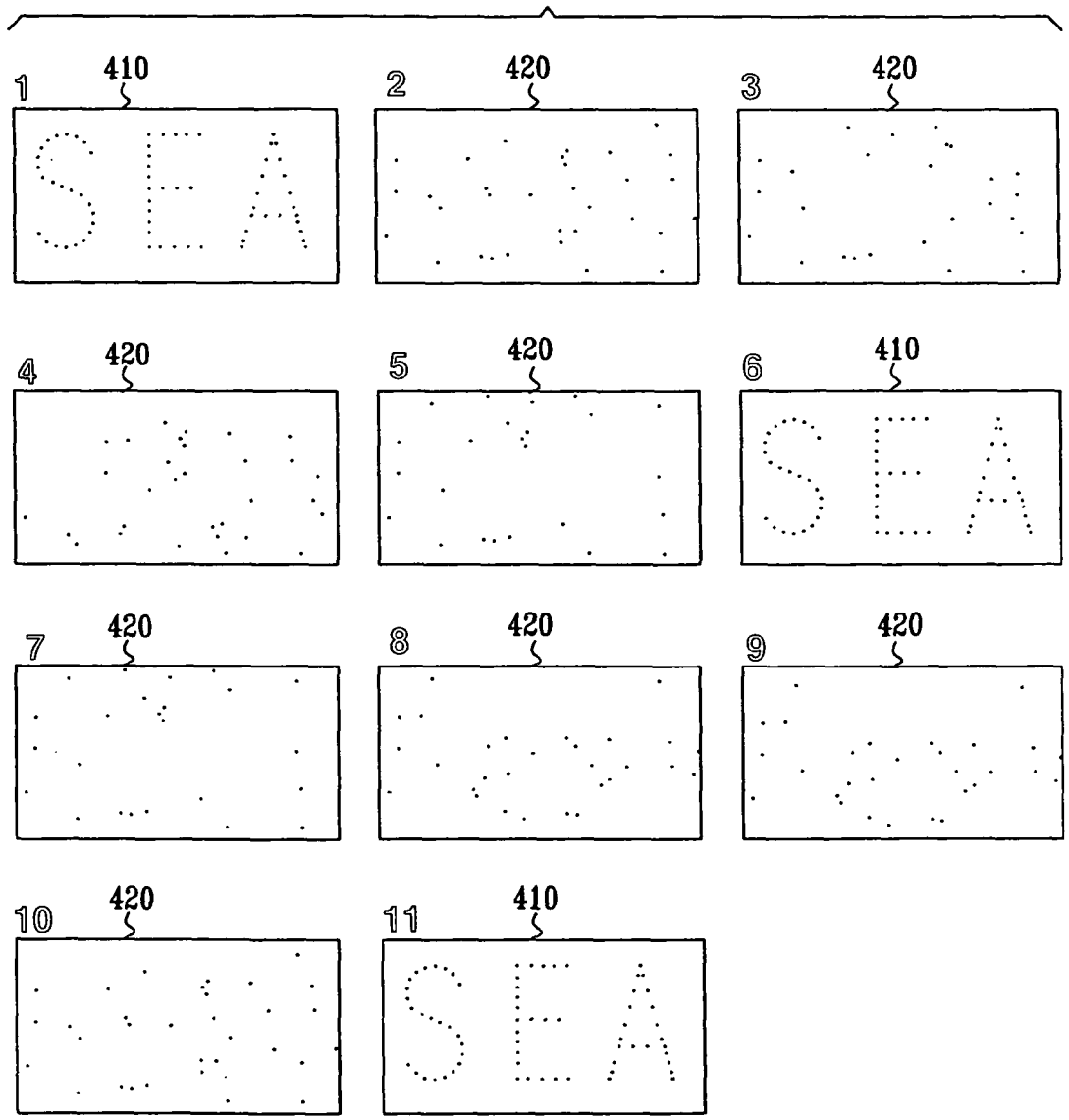
FIG. 4E is a simplified illustration of frames of an exemplary video stream, useful for understanding certain preferred embodiments of the system of FIGS. 1A-1D.

Reference is now made to FIG. 4E, which is a simplified illustration of frames of an exemplary video stream, useful for understanding certain preferred embodiments of the system of FIGS. 1A-1D. In more complex preferred embodiments of the present invention, the actual elements of the message could be positioned in such a way that, in a plurality of successive I-frames 210, the elements appear to move, and ultimately spell out a word or form an image. For example, and without limiting the generality of the foregoing, in FIG. 4E, the video illustrates reflections of sunlight on the sea. In FIG. 4E, the dots represent spots of sunlight on the sea. The background sea is not shown in FIG. 4E. The plurality of I-frames 410 of FIG. 4E show the sunlight reflecting the word "SEA". The predicted frames 420 show series of random dots. When played back in key frame trick mode, only the plurality of I-frames 410 is seen, as will be explained below with reference to FIG. 4F.

It is appreciated that the example of FIG. 4E is not meant to be limiting. Another example (not illustrated) may comprise a video of a display of fireworks comprising elements that appear to be part of the fireworks display, the elements appearing to move in seemingly random patterns. The I-frames of the video of the fireworks display are edited in advance such that when the I-frames alone are viewed, for example, and without limiting the generality of the foregoing, in trick mode, the elements would move together in a coordinated fashion, to spell out the name of an advertiser.

It is appreciated that video content is authored with the present invention in mind, using the standard video production process. Depending on the nature of the content, the authoring process may involve pure computer generated images, or, alternatively, post production manipulation of real video footage. The authoring process is described in greater detail below with reference to FIGS. 5A and 5B. For example, and without limiting the generality of the foregoing, under present video authoring technologies, content comprising an actor who appears to be floating undergoes post-filming editing to erase the wires holding up the actor in order to make it appear as though the actor is floating. After shooting such a scene, the video is loaded onto a computer and manipulated using a software package to edit out the supporting wires. In preferred embodiments of the present invention a similar process is implemented, whereby, after filming, the video is edited to achieve the effect of embedding the message in the video.

Figure 4F:
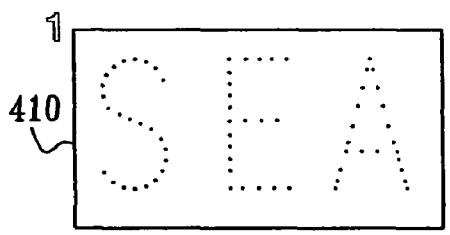
FIG. 4F is a simplified illustration of only I-frames selected out of the frames of the video stream of FIG. 4E.
Figure 4F:
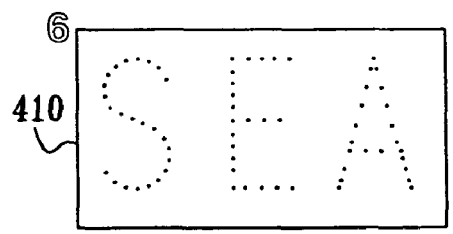
Figure 4F:
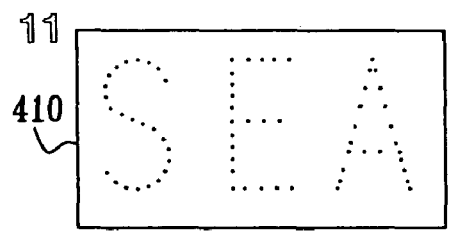

Reference is now made to FIG. 4F, which is a simplified illustration of the plurality of only I-frames 410 selected out of the frames of the video stream of FIG. 4E. During trick mode viewing, only the plurality of I-frames 410 out of the video stream of FIG. 4E are selected, as is shown in FIG. 4F. When the plurality of I-frames 410 shown in FIG. 4F are viewed, a viewer would see the image "SEA" appearing as sunlight reflected on the sea. The appearance of selected I-frames is explained in greater depth with reference to FIG. 5A.

Figure 5A:
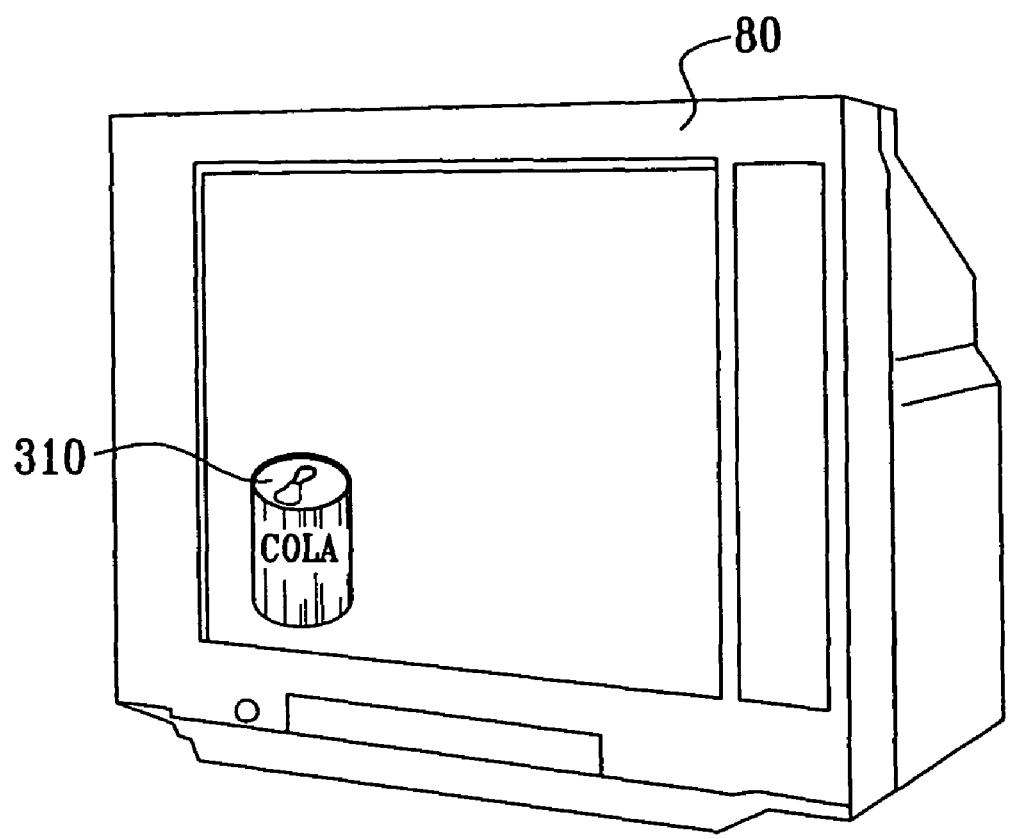
FIG. 5A is a simplified pictorial illustration of a resultant image on a television when viewing the exemplary stream of video frames of FIG. 3 in trick mode.

Reference is now made to FIG. 5A, which is a simplified pictorial illustration of the resultant image on a television 80 when viewing the exemplary stream of video frames of FIG. 3 in trick mode. When a sufficiently large quality of I-frames 210 (FIGS. 3 and 4) are played out without play out of the predictive frames, for example, and without limiting the generality of the foregoing, during PVR key frame fast forward, a graphic element 310 becomes visible on the television 80. The graphic element 310 preferably comprises an on-screen image resulting from decoding the I-frames 210 (FIGS. 3 and 4) comprising the message 270 (FIGS. 3 and 4). In some preferred embodiments of the present invention, the graphic element preferably comprises an advertisement.

The discussion of preferred embodiments of the present invention now turns to authoring content suitable for use in the system of FIGS. 1A-1D.

Figure 5B:
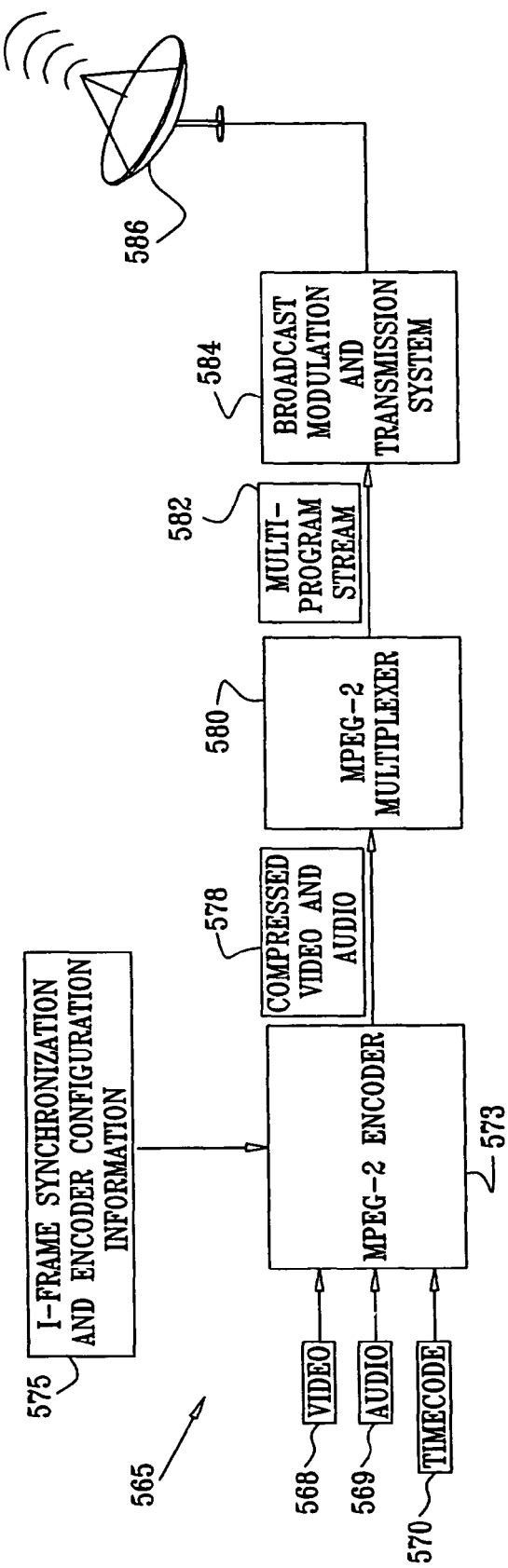
FIG. 5B is a partly pictorial partly block diagram illustration of one implementation of real time MPEG-2 encoding of a broadcast video stream for the system of FIGS. 1A-1D.

Reference is now made to FIG. 5B, which is a partly pictorial partly block diagram illustration of one implementation of real time MPEG-2 encoding of a broadcast video stream for the system of FIGS. 1A-1D. It is appreciated that authoring content suitable for use with the present invention generally comprises a two step process.
 1. First video must be created.
 2. Then the video is preferably encoded ensuring desired placement of key frames.

Creation of video preferably takes place using industry standard tools for video creation and manipulation. Video is preferably produced with a message embedded in frames at the key frame interval that will preferably be used at the encoding stage. For example, and without limiting the generality of the foregoing, if 12 frames comprise a group of pictures, then the key frame interval is 12 frames. Likewise, if 15 frames comprise a group of pictures, then the key frame interval is 15 frames. The creation of video suitable for use in the system of FIGS. 1A-1D preferably results in video and audio with an associated timeline represented by industry standard time code, such as, for example, and without limiting the generality of the foregoing, that defined in SMPTE standard 12M. SMPTE standard time code, of the format Hours:Minutes:Seconds:Frames, allows individual video frames to be identified. In the content, the time codes of individual frames comprising the embedded message, that need to be coded as key frames, are preferably identified.

In FIG. 5B, a video playout 565 comprising a video stream 568, an audio stream 569 and time code information 570 is fed into an MPEG-2 encoder 573. MPEG video encoder configuration 575 includes the desired group of pictures structure and the time code of frames that should be encoded as I frames. The MPEG-2 encoder 573 outputs compressed video and audio content 578. The compressed video and audio content 578 is input into an MPEG-2 multiplexer 580. The MPEG-2 multiplexer 580 outputs a multiplexed multi-program stream 582. The multiplexed multi-program stream 582 is input into a broadcast modulation and transmission system 584. The broadcast modulation and transmission system 584 preferably sends the modulated multiplexed multi-program stream for broadcast, such as, for example, and without limiting the generality of the foregoing, by a satellite broadcasting system 586. It is appreciated that are many commercially available MPEG-2 encoder 573, MPEG-2 multiplexer 580, and broadcast modulation and transmission system 584 which are suitable for use in preferred embodiments of the present invention.

Figure 5C:
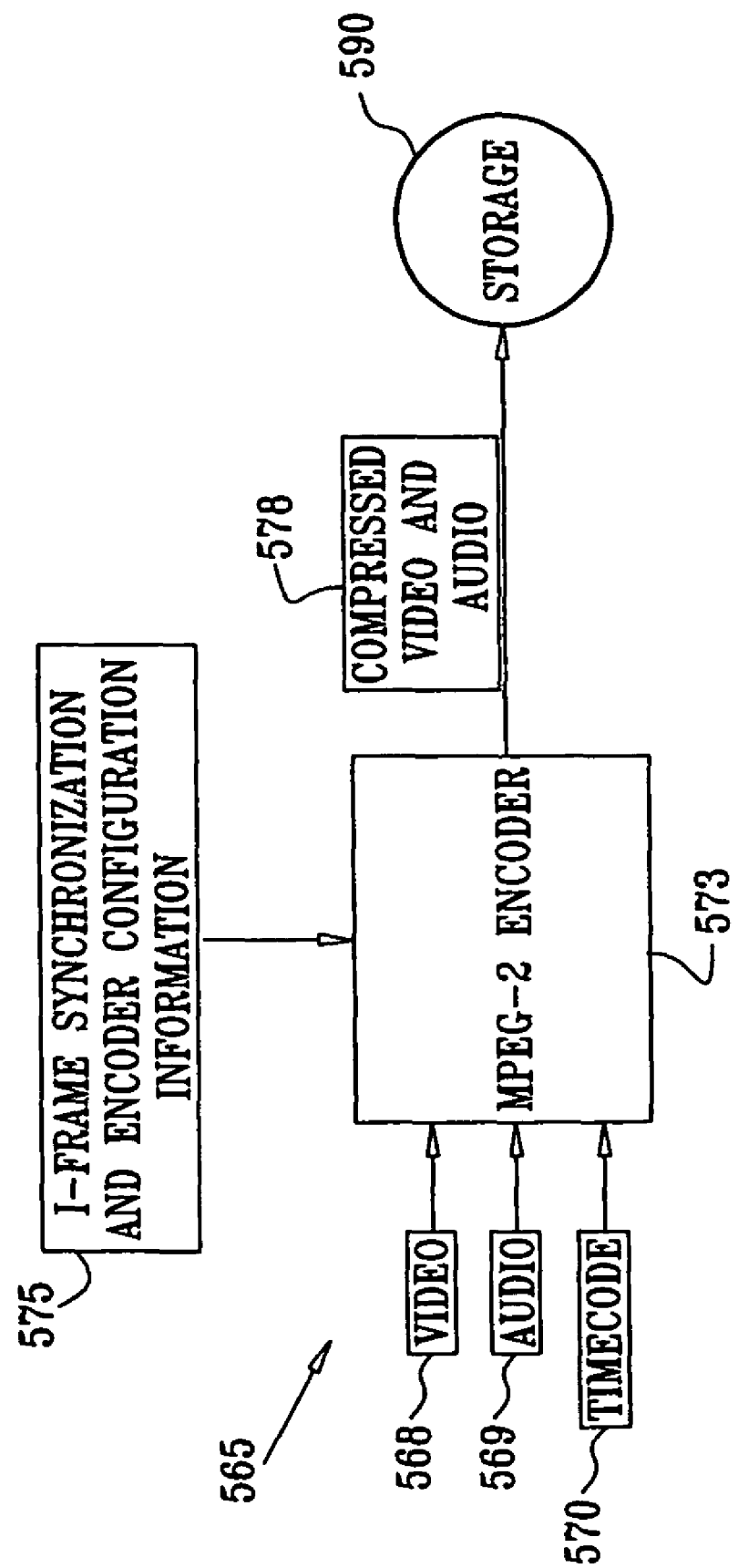
FIG. 5C is a block diagram of one implementation of MPEG-2 encoding of stored content for an alternative preferred embodiment of the system of FIGS. 1A-1D.

Reference is now made to FIG. 5C which is a block diagram of one implementation of MPEG-2 encoding of stored content for an alternative preferred embodiment of the system of FIGS. 1A-1D. The video playout 565 comprising the video stream 568, the audio stream 569 and time code information 570 is fed into the MPEG-2 encoder 573. MPEG video encoder configuration 575 includes the desired group of pictures structure and the time code of frames that should be encoded as I frames. The MPEG-2 encoder 573 outputs compressed video and audio content 578. The compressed video and audio content 578 is preferably transferred to removable media, for example, and without limiting the generality of the foregoing, a DVD. Alternatively, the compressed video and audio content 578 is transferred over the Internet.

Figure 6:
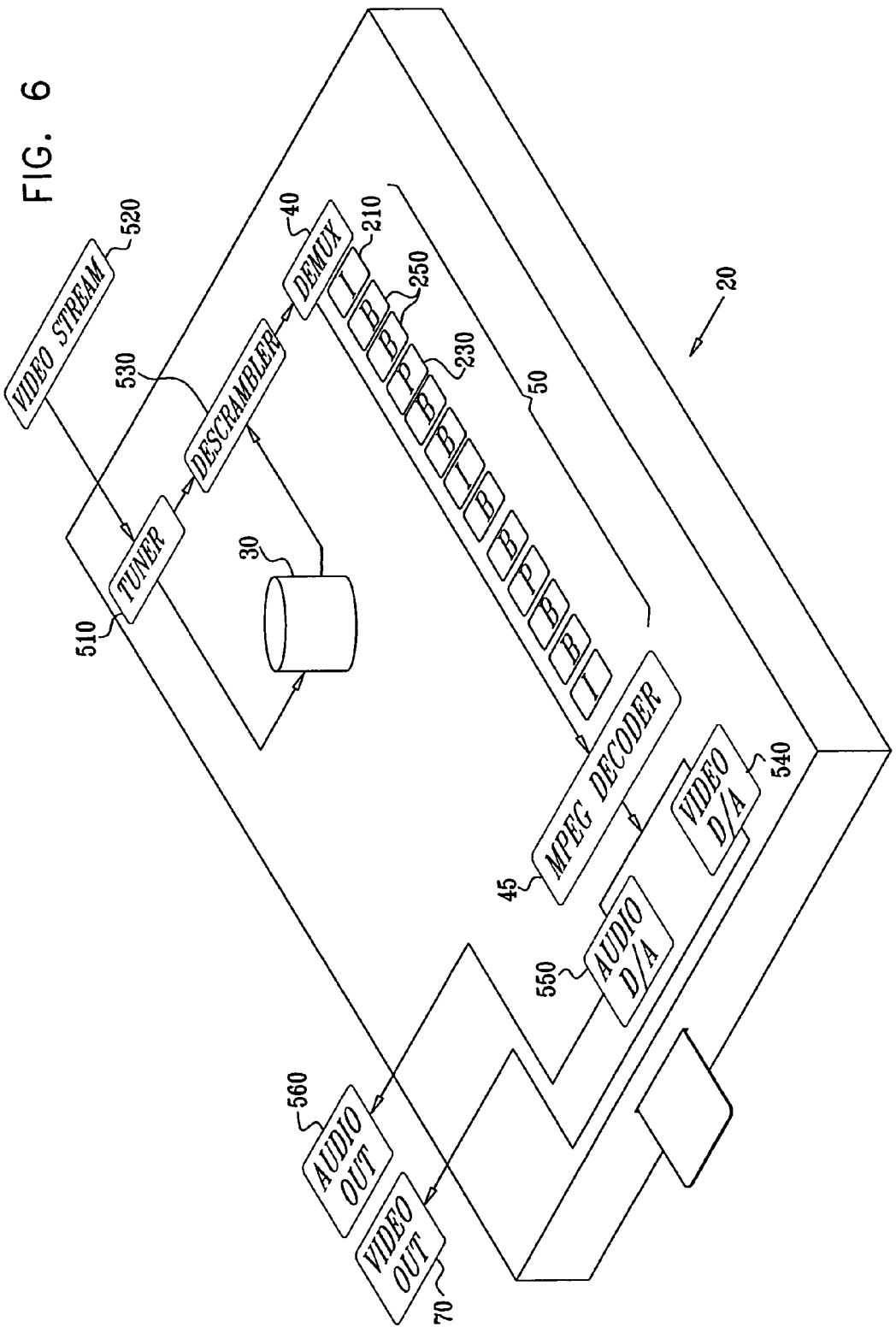
FIG. 6 is a simplified block diagram illustration of a preferred implementation of the set-top box/PVR of the system of FIGS. 1A-1D, showing individual video frames.

Reference is now made to FIG. 6, which is a simplified block diagram illustration of a preferred implementation of the set-top box/PVR 20 of the system of FIGS. 1A-1D, showing individual video frames. FIG. 6 is provided in order to explain in depth the functioning of the present invention in preferred embodiments thereof in the set-top box/PVR 20. The set-top box/PVR 20 is preferably implemented in hardware and software, and preferably comprises a tuner 510 which preferably receives a video stream 520. It is appreciated that the set-top box/PVR 20 may also be integrated in the television 80 (FIG. 1A). If the set-top box/PVR 20 stores the video stream 520, the video stream is preferably stored on the storage medium 30. At playback, the storage medium 30 streams the stored video stream to a descrambler 530, which is active to remove any scrambling which might have been applied to the video stream 520. Alternatively, the tuner 510 may preferably send the video stream 520 directly to the descrambler 530, for immediate playout.

The descrambler streams the video to the demultiplexor 40. It is appreciated that if the stream is not scrambled, then no descrambling takes place, and the descrambler may be optional; in such a case, the stream is sent directly to the demultiplexor 40. The demultiplexor 40 streams digital video 50, as individual I-frames 210, P-frames 230 and B-frames 250; for ease of depiction, not all of the frames in FIG. 6 are labeled with reference numerals. The demultiplexed digital video streams to the MPEG decoder 45. Decoded demultiplexed digital video frames 210, 230, 250 are converted to analog video and audio signals by video 540 and audio 550 digital to audio converters. A stream of analog video out 70 and audio out 560 is output, preferably to the television 80 (FIG. 1A).

It is appreciated that the preferred implementation of the set-top box/PVR 20 of the system of FIGS. 1A-1D shown in FIG. 6 may itself comprise a preferred embodiment of the present invention.

Figure 7:
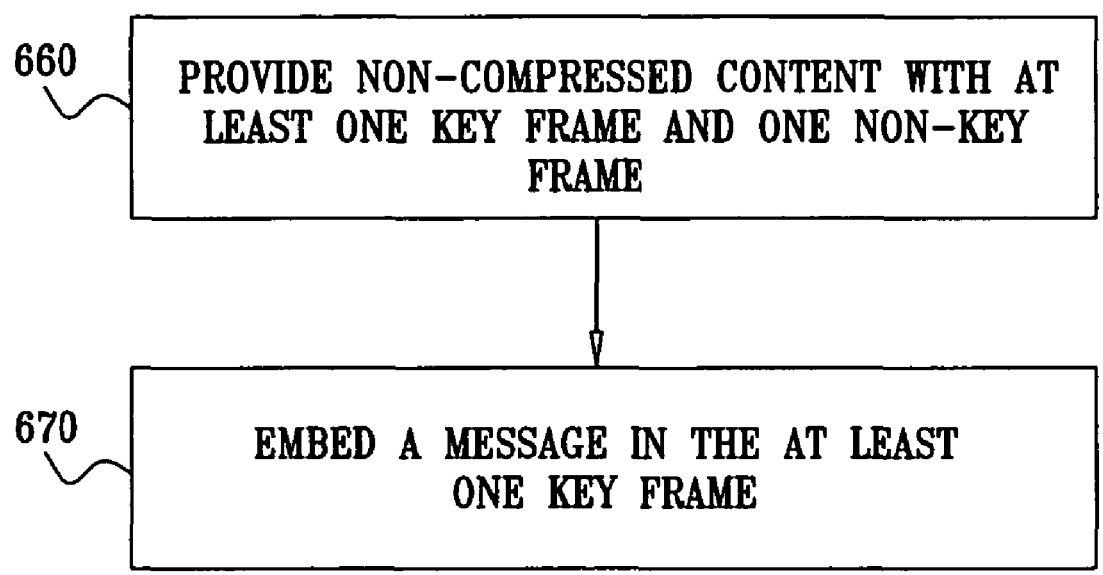
FIG. 7 is a simplified flowchart illustration of a preferred method of producing a stream of video frames comprising an embedded message, such as the exemplary stream of video frames of FIG. 3.

Reference is now made to FIG. 7, which is a simplified flowchart illustration of a preferred method of producing a stream of video frames comprising an embedded message, such as the exemplary stream of video frames of FIG. 3. The method of FIG. 7 preferably comprises the following steps:

Non-compressed content is provided with at least one key frame and one non-key frame (step 660).

A message is embedded in the at least one key frame (step 670). The message may be embedded on the key frame in a nonreal-time fashion, using an offline MPEG-2 editor, or the message can be embedded in real-time, preferably during MPEG-2 encoding, by an MPEG-2 encoder. MPEG-2 is mentioned by way of example only and is not meant to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for embedding a message in video content, the method comprising:

authoring non-MPEG video content during a video production process, thereby producing authored video content, the authoring including:

embedding a message in a plurality of video frames such that each frame of the plurality of video frames comprises an additional element embedded therein;

associating said each frame of the plurality of video frames with a time line represented as time code information such that individual frames comprising the embedded message are identified by the time code information, the interval between each identified individual frame of the plurality of video frames comprising the embedded message comprising a key frame interval to be used during video encoding of the video content; and video encoding the authored video content according to the time code information such that each identified individual frame is encoded as a key frame; and embedding a message hider in at least one non-key frame from among a plurality of non-key frames, the at least one non-key frame being a predictive frame intended for display following at least one defined key frame, wherein the message is visible when at least some of the key frames comprising the embedded message are played back using trick mode playback, and visibility of the message is hidden by the message hider during non-trick mode playback.

2. The method according to claim 1 and also comprising storing a stream comprising the video encoded content on a storage medium of an end-user unit, the compressed content comprising a plurality of key frames, wherein each individual key frame comprises the embedded message.

3. The method according to claim 2 and wherein the storage medium comprises a removable storage medium.

4. The method according to claim 2 and wherein the storage medium is external to the end-user unit.

5. The method according to claim 2 and wherein the storage medium comprises a pre-recorded medium.

6. The method according to claim 1 and wherein the video encoding comprises encoding according to one of MPEG-2 compression; and MPEG-4 compression.

7. The method according to claim 6 and wherein the encoded key frame comprises an I-frame.

8. The method according to claim 6 and wherein the non-key frame comprises at least one of: a P-frame; and a B-frame.

9. The method according to claim 1 and wherein the embedded message comprises a text message.

10. The method according to claim 1 and wherein the embedded message comprises a graphic element.

11. The method according to claim 1 and wherein the embedded message hider comprises a text message.

12. The method according to claim 1 and wherein the embedded message hider comprises a graphic element.

13. The method according to claim 1 and further comprising:

incorporating the video content in a multiplexed multi-program stream;

broadcast modulating the multiplexed multi-program stream; and broadcasting the multiplexed multi-program stream.

14. A system for embedding a message in video content, the system comprising:

a video content authoring system which authors non-MPEG video content during a video production process, thereby producing authored video content, the authoring system including:

a first embedder which embeds a message in a plurality of video frames such that each frame of the plurality of video frames comprises an additional element embedded therein;

a processor which associates said each frame of the plurality of video frames with a time line represented as time code information such that individual frames comprising the embedded message are identified by the time code information, the interval between each identified individual frame of the plurality of video frames comprising the embedded message comprising a key frame interval to be used during video encoding of the video content; and a video encoder which video encodes the authored video content according to the time code information such that each identified individual frame is encoded as a key frame; and a second embedder which embeds a message hider in at least one non-key frame from among the plurality of non-key frames, the at least one non-key frame being a predictive frame intended for display following at least one defined key frame, wherein the message is visible when at least some of the key frames comprising the embedded message are played back using trick mode playback, and visibility of the message is hidden by the message hider during non-trick mode playback.

15. Apparatus for embedding a message in video content, the apparatus comprising:

means for authoring non-MPEG video content during a video production process, thereby producing authored video content, the means for authoring including:

means for embedding a message in a plurality of video frames such that each frame of the plurality of video frames comprises an additional element embedded therein;

means for associating said each frame of the plurality of video frames with a time line represented as time code information such that individual frames comprising the embedded message are identified by the time code information, the interval between each identified individual frame of the plurality of video frames comprising the embedded message comprising a key frame interval to be used during video encoding of the video content; and means for video encoding the authored video content according to the time code information such that each identified individual frame is encoded as a key frame; and means for embedding a message hider in at least one non-key frame from among the plurality of non-key frames, the at least one non-key frame being a predictive frame intended for display following at least one defined key frame, wherein the message is visible when the at least some of the key frames comprising the embedded message are played back using trick mode playback, and visibility of the message is hidden by the message hider during non-trick mode playback.

16. A message delivery method, the method comprising:

decompressing compressed video at a video decoder, the compressed video comprising video comprising an embedded message, the video comprising video produced by:

authoring non-MPEG video content during a video production process, thereby producing authored video content, the authoring including:

embedding a message in a plurality of video frames such that each frame of the plurality of video frames comprises an additional element embedded therein;

associating said each frame of the plurality of video frames with a time line represented as time code information such that individual frames comprising the embedded message are identified by the time code information, the interval between each identified individual frame of the plurality of video frames comprising the embedded message comprising a key frame interval to be used during video encoding of the video content;

video encoding the authored video content according to the time code information such that each identified individual frame is encoded as a key frame; and embedding a message hider in at least one non-key frame from among a plurality of non-key frames, the at least one non-key frame being a predictive frame intended for display following at least one defined key frame, wherein the message is visible when at least some of the key frames comprising the embedded message are played back using trick mode playback, and visibility of the message is hidden by the message hider during non-trick mode playback; and displaying the decompressed video.

17. The message delivery method according to claim 16 and wherein the compressed video is received from a broadcast video stream.

18. The message delivery method according to claim 16 and wherein the compressed video is received from a digital recording.

19. The message delivery method according to claim 18 and wherein the digital recording is pre-recorded on a medium.

20. The message delivery method according to claim 16 and wherein the compressed video is compressed with one of: MPEG-2; and MPEG-4 compression.

* * * * *